(12) United States Patent
Penev

(10) Patent No.: US 9,080,558 B2
(45) Date of Patent: Jul. 14, 2015

(54) DUAL HYBRID FLUID HEATING APPARATUS AND METHODS OF ASSEMBLY AND OPERATION

(71) Applicant: Krassimire Mihaylov Penev, Stamford, CT (US)

(72) Inventor: Krassimire Mihaylov Penev, Stamford, CT (US)

(*) Notice: Subject to any disclaimer, the term of this patent is extended or adjusted under 35 U.S.C. 154(b) by 168 days.

(21) Appl. No.: 13/714,496

(22) Filed: Dec. 14, 2012

(65) Prior Publication Data

US 2014/0000257 A1 Jan. 2, 2014

Related U.S. Application Data

(63) Continuation of application No. 13/234,292, filed on Sep. 16, 2011, now Pat. No. 8,356,481, which is a continuation-in-part of application No. 12/820,241, filed on Jun. 22, 2010, now Pat. No. 8,037,931, which is a continuation-in-part of application No. 12/205,979, filed on Sep. 8, 2008, now abandoned, said application No. 12/820,241 is a continuation-in-part of application No. PCT/US2009/004741, filed on Jul. 7, 2009, which is a continuation of application No. 12/205,979, filed on Sep. 8, 2008, now abandoned.

(60) Provisional application No. 61/086,819, filed on Aug. 7, 2008.

(51) Int. Cl.
| | | |
|---|---|---|
| B60K 16/00 | (2006.01) | |
| F03G 6/00 | (2006.01) | |
| F03G 6/06 | (2006.01) | |
| F24J 2/12 | (2006.01) | |
| F24J 2/42 | (2006.01) | |

(52) U.S. Cl.
CPC . *F03G 6/065* (2013.01); *F24J 2/12* (2013.01); *F24J 2/42* (2013.01); *Y02B 10/20* (2013.01); *Y02B 30/52* (2013.01); *Y02E 10/46* (2013.01); *Y10T 29/49355* (2015.01)

(58) Field of Classification Search
CPC ............... F03G 6/065; F24J 2/12; F24J 2/42; Y10T 29/49355; Y02B 30/52; Y02B 10/20; Y02E 10/46
USPC .......................................... 60/641.8–641.15
See application file for complete search history.

(56) References Cited

U.S. PATENT DOCUMENTS

| | | | |
|---|---|---|---|
| 3,922,876 | A | 12/1975 | Wetherington et al. |
| 4,119,087 | A | 10/1978 | Cook |
| 4,171,617 | A | 10/1979 | Sakamoto et al. |
| 4,190,199 | A | 2/1980 | Cawlet et al. |
| 4,192,144 | A | 3/1980 | Pierce |
| 4,270,363 | A | 6/1981 | Maing et al. |
| 4,380,156 | A | 4/1983 | Ecker |
| 4,398,391 | A * | 8/1983 | English, Jr. ................ 60/641.15 |
| 4,476,853 | A | 10/1984 | Arbogast |
| 4,479,487 | A | 10/1984 | Migdal |

(Continued)

*Primary Examiner* — Hoang Nguyen
(74) *Attorney, Agent, or Firm* — Robert J. Hess; Hess Patent Law Firm LLC

(57) ABSTRACT

A dual hybrid heating apparatus, method of assembly and operation to pre-heat vaporizable fluid by free heat sources—waste heat from heat recovery units and insolation. The pre-heated vaporizable fluid is routed to where a parabolic dish solar concentrator vaporizes it to turn a blade of a turbine generator to generate electricity. Heat is extracted from the vapor to form condensate, but the vapor also heats the condensate before being cooled by heat exchange with fluid cooled by a cooling tower.

19 Claims, 2 Drawing Sheets

(56) References Cited

U.S. PATENT DOCUMENTS

| | | |
|---|---|---|
| 4,690,207 A | 9/1987 | Trage et al. |
| 5,050,394 A | 9/1991 | Dudley et al. |
| 5,775,107 A | 7/1998 | Sparkman |
| 6,996,988 B1 | 2/2006 | Bussard |
| 7,578,140 B1 | 8/2009 | Wiggs |
| 2007/0157614 A1* | 7/2007 | Goldman ............... 60/641.15 |

* cited by examiner

DUAL HYBRID FLUID HEATING APPARATUS AND METHODS OF ASSEMBLY AND OPERATION

CROSS-REFERENCE TO RELATED APPLICATIONS

This application is a continuation of Ser. No. 13/234,292 filed Sep. 16, 2011, which in turn is a continuation-in-part of Ser. No. 12/820,241 filed Jun. 22, 2010, whose contents are incorporated herein by reference and which in turn is a continuation-in-part of U.S. patent application Ser. No. 12/205,878 filed Sep. 8, 2008, whose contents are incorporated herein by reference and which in turn claims the benefit of priority from U.S. provisional patent application No. 61/086,819, filed on Aug. 7, 2008, the contents of which are hereby incorporated herein by reference, and a continuation-in-part of international patent application No. PCT/US2009/049741 filed Jul. 7, 2009, the contents of which are incorporated herein by reference and which in turn claims priority from U.S. patent application Ser. No. 12/205,878 filed Sep. 8, 2008 and provisional patent application Ser. No. 61/086,819 filed Aug. 7, 2008.

BACKGROUND OF THE INVENTION

1. Field of the Invention

The present invention relates to a dual hybrid heating apparatus. The apparatus satisfies a demand for domestic hot water by heating potable water by heat exchange with a fluid heated from waste heat of at least one heat recovery unit and with insolation from at least one solar collector. Once the demand is satisfied, the heated fluid is then vaporized with a parabolic dish solar concentrator (collector) and fed to a turbine that generates electricity for a power grid. One or more controllers direct operation of equipment and in-line valves to operate the dual hybrid heating apparatus based on sensor readings in a manner that satisfies the demand and generates the electricity without damaging the equipment from overheating.

2. State of the Art

US patent application publication no. 2010003953 and US patent application publication no. 20100257882 are known. The former divulges a water heating system for controlling the heating of potable water in commercial or private dwellings with improved energy efficiency. The water heating system heats potable water in a tank by transferring excess heat generated in a refrigeration unit with a heat exchanger, and by extracting energy from insolation with a solar water heater unit. The system includes several control systems for regulating the operation of the heat exchanger, solar water heater unit, and refrigeration unit to provide increased energy efficiency and longevity to the various components of the system. The latter divulges a hybrid heating apparatus heats potable water with waste heat from heat recovery units and insolation from solar collectors. A single circulation pump circulates fluid between at least one heat exchanger and each of the heat recovery units and preferably the solar collector. A single controller receives sensor readings from the heat recovery units and the solar collector units and receives a demand to heat the potable water. To satisfy the demand, the controller determines the extent to which the demand may be satisfied from heat available from the heat recovery units and the solar collector units and sends command signals both to the circulating pump to circulate the fluid and to appropriate ones of valves at connections to those heat recovery units and solar collector units to allow fluid to circulate to be heated to flow to the heat exchanger for effecting heat exchange to heat the potable water. Once the demand for heated potable water is satisfied, the fluid from the solar collection units is routed to a heat dump.

SUMMARY OF THE INVENTION

A water heating apparatus is provided to satisfy a demand for heated potable water by carrying out heat exchange with the potable water by "free heat" energy sources, i.e., waste heat of at least one heat recovery unit and insolation of at least one solar heat collection unit. Once the demand is satisfied, the "free heat" sources then pre-heat another fluid by heat exchange that is to be vaporized with a solar collector and then fed to a turbine that generates electricity to a power grid.

The at least one heat recovery unit, the at least one solar heat collection unit, the parabolic dish solar concentrator (collector) and the heat exchangers each include sensors that measure temperature, pressure, or other parameters at various locations. A controller controls their operation based on the measured parameters to maximize the energy efficiency, hot water capacity, and longevity of the system while reducing the system's operational costs and fuel consumption.

The at least one heat recovery unit recovers waste heat from a refrigeration unit, which preferably includes a fan controller that operates to deactivate (turn off) the cooling fan of the refrigeration unit when the refrigerant is sufficiently cooled on account of the operation of the heat exchanger in transferring heat away from the refrigerant to the water in the tank, and operates to activate (turn on) the cooling fan of the refrigeration unit when additional cooling is needed.

The heat recovery unit (HRU) preferably includes an HRU controller that operates to activate the heat recovery unit to circulate a fluid to heat exchange with "waste heat" that would otherwise be expelled into the atmosphere by a fan blowing across refrigerator/freezer coils that contain a refrigerant. To accomplish this, the temperature of the fluid heated with the waste heat must be higher than the temperature of the fluid in the potable water tank and there needs to be a demand for heating the potable water in the potable water tank that is not yet satisfied (such as where the potable water temperature is under 200 degrees Fahrenheit).

The solar heat collection unit preferably includes solar controller that operates to activate the solar heat collection unit to circulate the same fluid (or a different one) that heats from insolation in at least one solar collector. To accomplish this, heat from insolation must be available (8-24 degrees Fahrenheit hotter than the potable water temperature for efficient heat transfer) and there must be a demand for heating the potable water tank that is not yet satisfied (such as where the potable water temperature is under 200 degrees Fahrenheit).

In the event that the demand for heated potable water is satisfied, a further controller operates a three-way valve to cause the heated fluid to bypass the potable water tank to enter another heat exchanger, where a fluid (such as water or oil) is heated and conveyed to a location where a parabolic dish solar concentrator (collector) vaporizes the fluid to feed same onto a turbine that generates electricity for a power grid. Of course, the HRU controller, the solar controller and the further controller may all be a single controller that provides all the necessary commands to all equipment and valves to carry out their respective operation in a manner compatible with each other that prevents overheating or damage to such equipment and valves.

Additional objects, advantages, and embodiments of the invention will become apparent to those skilled in the art upon reference to the detailed description taken in conjunction with the provided figures.

DETAILED DESCRIPTION OF THE PREFERRED EMBODIMENT

Figure 1:
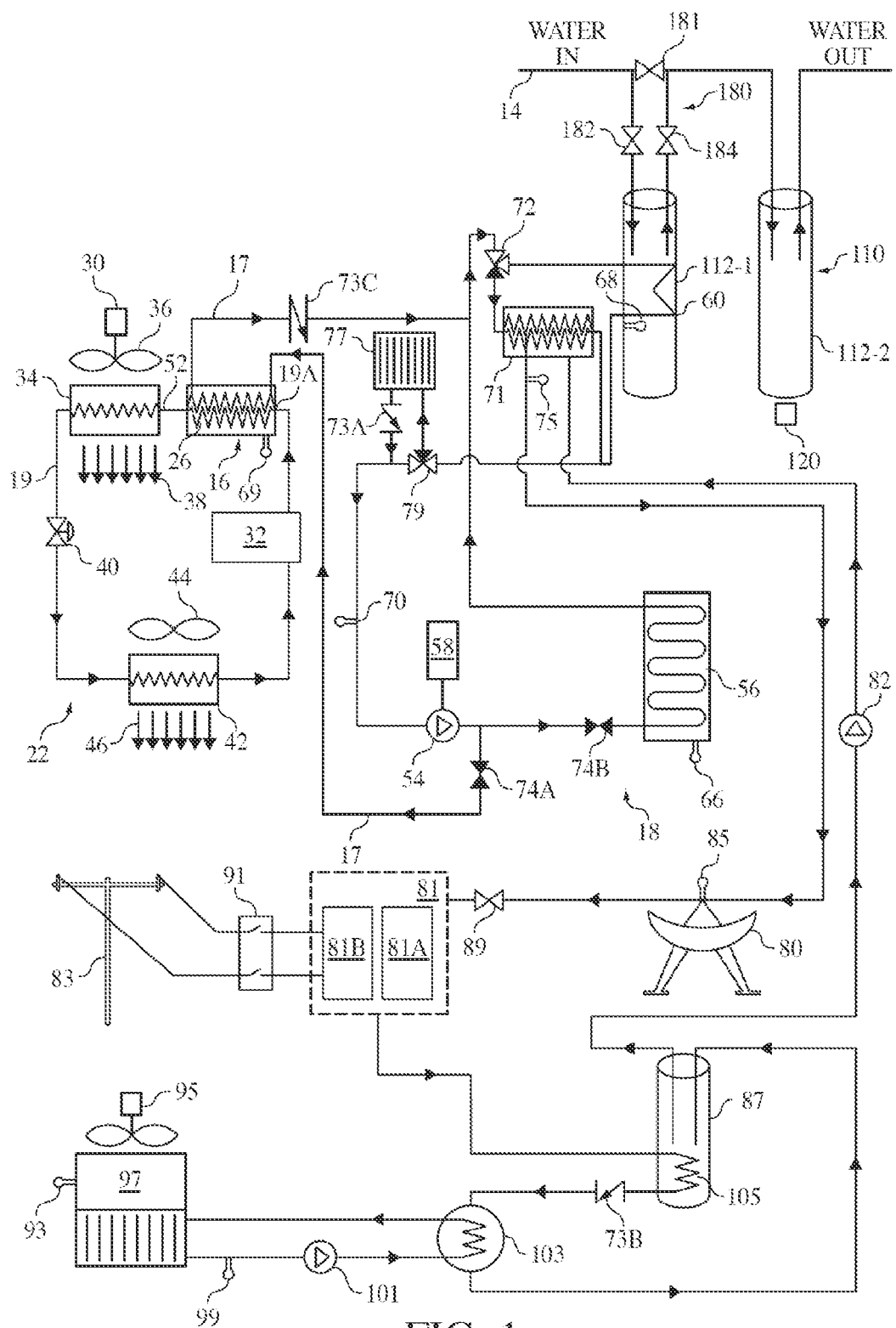
FIG. 1 is a schematic depiction of an exemplary embodiment of a water heating system according to the present invention.

Turning now to FIG. 1, the present invention brings together multiple energy systems to heat fluid in a closed loop either at the same time, consecutively or alternatively with at least one "free heat" energy source—i.e., waste heat from at least one heat recovery unit 16 and insolation from at least one solar collection unit 18. The heated fluid enters a heat exchanger 60 to satisfy demand to heat potable water. Once the demand is satisfied, the heated fluid is routed to another heat exchanger 71 to pre-heat additional fluid (such as water or oil) being conveyed to a parabolic dish solar concentrator (collector) 80 that heats the fluid hot enough to transform the fluid into a vapor. The vapor is fed to a turbine 81A to turn its blades so a generator 81B can generate electricity. The vapor discharges at a lower pressure to a heat exchanger 103 to become a condensate after heat extraction that in turn is later heated as part of a liquid-vapor heating cycle. The generated electricity is transmitted to a power grid 83. The heat exchanger 103 extracts heat from the vapor with fluid cooled by a cooling tower 97.

Preferably, a water heating apparatus or system 110 of the present invention is a two-tank system that includes a pre-heat tank 112-1, a conventional heating tank 112-2, and a bypass system 180. The conventional heating tank 112-2 is in fluid communication with a source 14 of potable water such as, but not limited to, a well or a city water source. The tank 112-1 contains a heat exchanger 60 configured to heat water stored in the tank 112-1 by heated fluid in communication with a heat recovery unit 16 and a solar water heater unit 18.

The system is configured to heat the potable water in the pre-heat tank 112-1 by using heat available from "free" sources (e.g., waste heat recovery and solar units) in conjunction with the conventional heating element 120 to provide an energy efficient hot water heating system 110, a conventional heating tank 112-2, and a bypass system 180. The conventional heating tank 112-2 includes a conventional heating element 120, which may be an electrically powered element, a gas-burning element, an oil-burning element, and combinations thereof. The combination of the pre-heat tank 112-1 with the heating tank 112-2 allows the system 110 to maximize the collection and storage of heat from the heat recovery unit 16 and the solar water heater or solar collection unit 18.

The heat recovery unit 16 of the system is in a heat exchange relationship with a conventional vapor compression refrigeration unit 22 such as, but not limited to, an air conditioner, a refrigerator, a freezer, a heat pump, or equivalent refrigeration units known in the art. The heat recovery unit 16 includes a circulating pump 54, which circulates fluid medium from the tank 12 through a flow loop 17, a heat exchanger 26, and a controller 58. When heat is available from the vapor compression refrigeration unit 22, the controller 58 is configured to open valve 74A and activate the pump 54 to pump the fluid medium from the tank 112-1 through the heat exchanger 26 and back into the tank 112-1.

The refrigeration unit 22 includes a flow loop 19 for circulating refrigerant. A compressor 32 operably coupled to the flow loop 19 compresses the refrigerant and passes the compressed refrigerant to a condenser 34. The condenser 34 is also operably coupled to the flow loop 19 and includes a cooling fan 36 to force outside air 38 across the condenser 34 to remove heat from the refrigerant within the flow loop 19.

Thus, the refrigeration unit 22 typically consumes electrical energy to operate the cooling fan 36 to expel waste heat to the outside air 38. The compressed, condensed refrigerant is then expanded in an expansion valve 40 to a lower temperature, and then passed through an evaporator 42. The evaporator 42 includes a blower unit 44, which blows inside air 46 from a conditioned space across the evaporator 42. The refrigeration unit 22 thus provides conditioned air to a conditioned space.

The heat exchanger 26 of the heat recovery unit 16 is in heat exchange communication with the refrigerant in the flow loop 19 between the compressor 32 and the condenser 34, which is generally at a high temperature. The heat exchanger 26 operates to transfer waste heat (which is typically removed from the refrigerant by the fan 36 in the prior art) to the water in tank 12, which will generally be at a lower temperature than that of the refrigerant between the compressor 32 and the condenser 34. The heat exchanger 26 includes a first flow path 19a, which is part of the flow loop 19 of the refrigeration unit 16, and a second flow path which is part of the flow loop 17 of the heat recovery unit 16 and in fluid communication with the first flow path 19a. The heat recovery unit 16 removes heat from the refrigerant in the flow loop 19 of the refrigeration unit 22 and in fluid communication with the potable water in the tank 12, which also reduces the typical cooling requirements of the fan 36.

The operation of the controller 58 of the heat recovery unit 16 of the system is best understood with reference to FIG. 1. The controller 58 opens the valve 74A and activates the circulation pump 54 to circulate a fluid medium (heat transfer fluid) from the tank 12 through the heat exchanger 26 when heat is available from the refrigeration unit 22. For example, the controller 58 can receive a first sensor input 69 indicative of a condition of the refrigerant in the refrigeration unit 22 such as, but not limited to, a temperature signal, a pressure signal, or other signals conveying information related to the refrigerant's properties. When the first input 69 reaches a predetermined level indicating that heat is available from the refrigeration unit 22, the controller 58 may activate the circulation pump 54.

The controller 58 is also preferably configured to deactivate the circulating pump 54 to cease circulating fluid medium from the tank 12 through the heat exchanger 26 when the water within the tank 12 reaches a predetermined temperature. For example, the controller 58 may receive a second sensor input 68 indicative of the water temperature within the tank 12. When the second sensor input 68 reaches a predetermined level, the controller 58 deactivates the circulation pump 54. In one example, the second sensor input 68 may be a temperature signal and the predetermined level might be 155 degrees Fahrenheit (F.).

The controller 58 may also be configured to activate the circulating pump 54 when the temperature of the fluid medium in the second fluid loop 17 becomes so low that it is in danger of freezing. For example, in an Open Loop configuration the controller 58 may receive a first sensor input 69 indicative of the fluid medium temperature within the second fluid loop 17. When the first sensor input 69 reaches a predetermined level, the controller 58 activates the circulation pump 24 to circulate water from the tank 12 through the second fluid loop 17 to prevent freezing therein. It is noted that if the refrigeration unit 22 is operational, then the circulating pump 54 will operate as discussed above to transfer heat from the refrigerant to the fluid medium at the heat exchanger 26.

In the event that the refrigeration unit 22 goes down during the winter months, the operation of the circulating pump 54 to circulate fluid medium from the tank 12 through the second fluid loop 17 will help to prevent the fluid medium from freezing in the second fluid loop 17. It is anticipated that other back-up sources of heat may be utilized with the system (such as gas or oil) to heat the tank 12 so that the tank 12 water will remain warm even during a long power outage. It is also anticipated that this anti-freezing operation of the controller 58 will be far less common, but will provide an important safety measure in the winter time to prevent the heat recovery unit 16 from freezing and increase its longevity.

The controller 58 can be embodied by a variety of control circuitry, such as a programmed controller or dedicated hardware logic (PLD, FPGA, ASIC) and supporting circuitry (e.g., thermistors for temperature sensing or pressure transducers for pressure sensing), one or more relays and supporting circuitry (e.g., thermostats for temperature sensing or pressure controllers for pressure sensing) or other suitable circuitry.

Figure 2:
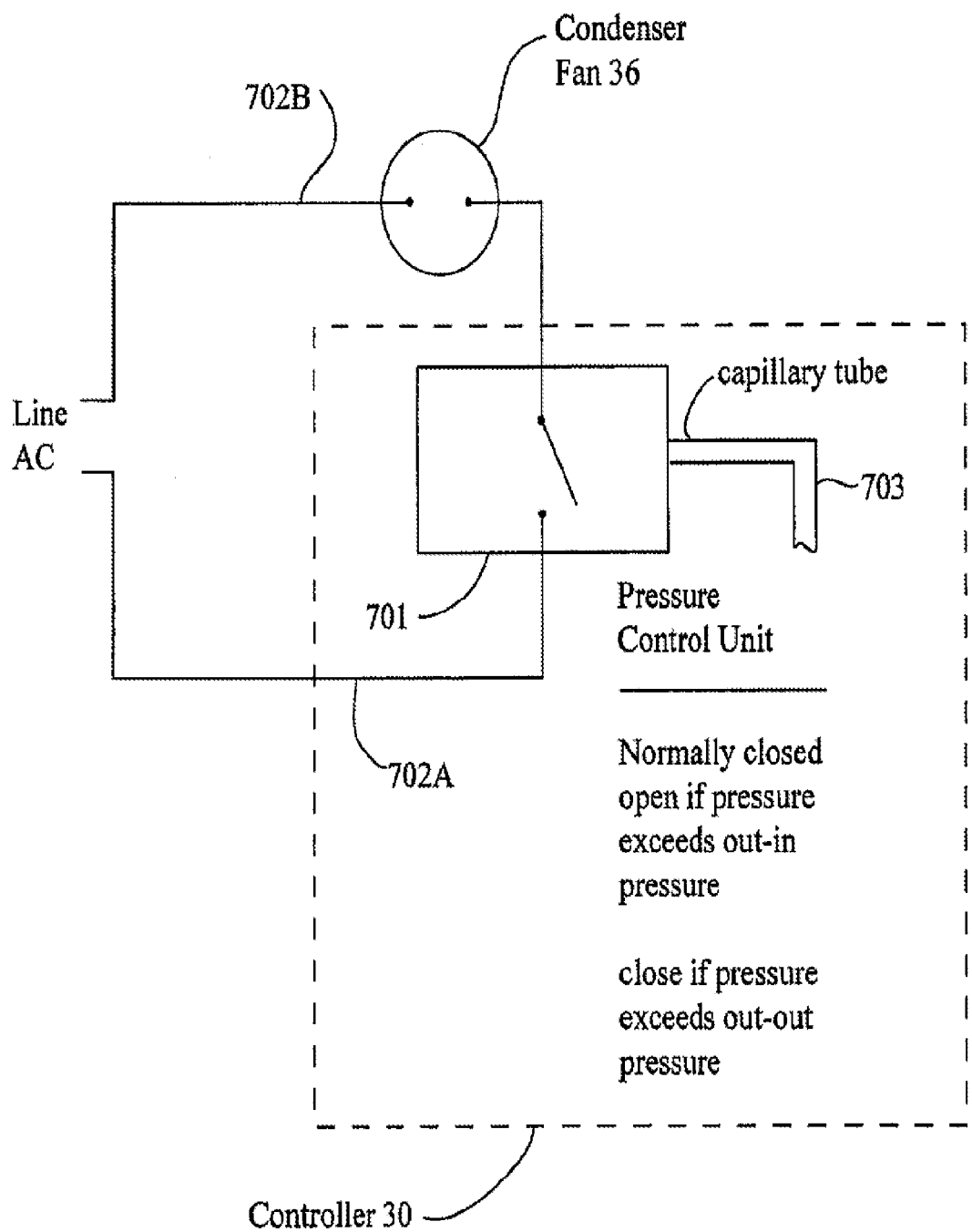
FIG. 2 is a schematic of the circuitry of an embodiment of the operational control of the fan of the invention.

The operational control of the fan 36 of the refrigeration unit 16 is best understood with reference to FIGS. 1 and 2. A fan control 30 is provided in the form of a delay relay or controller in electrical communication with the fan 36. During normal operation of the refrigeration unit 16, the fan control 30 delays the operation of the fan 36 until a condition within the refrigeration unit 16 reaches a predetermined level. As discussed above, the heat recovery unit 16 removes heat from the refrigerant in the flow path 19a of the flow loop 19 of the refrigeration unit 22 that would otherwise need to be removed by the fan 36. Thus, the fan 36 need not be operated until the heat recovery unit 16 can no longer remove enough heat from the refrigeration unit 22 to keep the refrigeration unit 16 operating in a desired manner.

For example, in medium temperature refrigeration units such as those present in a restaurant, bar, or other commercial establishment, it is typically desired that the refrigerant exiting the condenser 34 be in a vapor condition with a desired temperature and/or pressure. The fan control 30 receives an input from the refrigeration unit 22, which is indicative of the temperature of refrigerant within the flow loop 19 of the refrigeration unit 16. The fan control 30 maintains the fan 36 in an off condition until the input reaches a predetermined level, at which time, the fan control 30 activates the fan 36 to expel heat from the refrigerant to the ambient air 38 at the condenser 34.

In one preferred embodiment, the input is a pressure input from a pressure transducer positioned at 52 in the flow loop 19 of the refrigeration unit 22 between the heat exchanger 26 and the condenser 34. If the pressure of the refrigerant in the flow loop 19 exceeds a predetermined limit after passing through the heat exchanger 26, then insufficient heat has been removed from the refrigerant by the heat exchanger 26. Typically, this results from the water in the tank 12 being of a sufficiently high temperature from the heat already collected by the heat recovery unit 16 and/or the solar collection unit 18 (further discussed below).

When the pressure of the refrigerant in the flow loop 19 exceeds a predetermined limit after passing through heat exchanger 26, the fan control 30 activates the cooling fan 36 to expel waste heat from the refrigerant to the outside air 38. Conversely, when the pressure of the refrigerant in the flow loop 19 is below the predetermined limit after passing through heat exchanger 26, the fan control 30 maintains the cooling fan 36 in a normally deactivated state. In embodiments of the invention in which the refrigeration unit 22 is a medium temperature refrigeration unit, the predetermined pressure limit at transducer at 52 could be approximately 200 pounds per square inch (PSI).

The controller 30 can be embodied by a variety of control circuitry, such as a programmed controller or dedicated hardware logic (PLD, FPGA, ASIC) and supporting circuitry (e.g., thermistors for temperature sensing or pressure transducers for pressure sensing), one or more relays and supporting circuitry (e.g., thermostats for temperature sensing or pressure controllers for pressure sensing) or other suitable circuitry. An exemplary embodiment of controller 30 is shown in FIG. 2, which includes a pressure control unit 701 in electrical connection between one leg 702A of line AC and one of the terminals of the condenser fan 36 as shown. The other terminal of the condenser fan is connected to the other leg 702B of line AC. A capillary tube 703 is in fluid communication with the fluid loop 19, preferably at a point downstream of the heat recovery unit 26 and upstream of the condenser 34 (e.g., preferably at 52 as shown, but may optionally be placed anywhere along the length of the condenser) in order to sample the pressure of the refrigerant in the fluid loop 19. The pressure control unit 701 measures the sampled pressure of the refrigerant of the fluid loop 19 and provides a normally-off current path between leg 702A and the terminal of the condenser fan 36 that is turned on when the sampled pressure reaches a predetermined cut-in pressure. This current path is then returned to the normally-off state when the pressure falls below a predetermined cut-off pressure. In the preferred embodiment, the cut-in and cut-out pressures are set by user input (for example, by user adjustment of dials for setting such cut-in and cut-out pressures). In the preferred embodiment, the pressure control unit 701 is realized by a unit (e.g., the 016 Single Pressure Control unit) sold commercially by Ranco Controls of Delaware, Ohio.

Thus, system 110, through the operation of the fan control 30 of the refrigeration unit 22, maximizes the amount of heat recovered by the heat recovery unit 16 by eliminating the expulsion of heat from the refrigerant to the ambient air when such expulsion not needed. Further, system 110 minimizes energy usage by leaving fan 36 in a normally "off" state until such time as the heat recovery unit 16 no longer has sufficient capacity to remove enough heat from the refrigerant in the flow loop 19 to keep the refrigeration unit 22 operating as desired.

The system 110 of the present invention also preferably incorporates in one fluid medium loop of a hybrid water heating system, the solar water heater unit 18, and uses it in conjunction with the heat recovery unit 16. The solar water heater unit 18 and HRU 16 and its operational control is best understood with reference to FIG. 1.

The solar collection unit 18 provides heat captured from solar energy to the water in the tank 12. Thus, the water in tank 112-1 is heated not only by the heat recovery unit 16, but also by the solar collection unit 18. The fan control 30 protects the refrigeration unit 22 from damage due to overheating and maintains the refrigeration unit 22 in a desired operating condition when a large amount of heat is added to the water in the tank 112-1 by both the heat recovery unit 16 and solar collection unit 18 thru one Solar and HRU fluid medium Loop.

The solar collection unit 18 includes a circulating pump 54, which circulates a heat transfer medium through a flow loop 17. A solar collector 56 and a heat exchanger 60 are operably coupled to the flow loop 17 as shown in FIG. 1. A controller 58 is provided for opening the valve 74B and for selectively activating and deactivating the circulating pump 54 of the solar collection unit 18. When heat is available from insolation by the solar collection unit 18, the controller 58 is configured to open the valve 74B and to activate the circulating pump 54 to pump a heat-transfer fluid such as, but not limited to, propylene glycol through the solar collector 56 and the heat exchanger 60 via the fluid loop 17. The solar collector 56 thus heats the heat-transfer fluid, and the heat from the heat-transfer fluid is used to indirectly heat the water in the tank 112-1 via the heat exchanger 60.

The controller 58 may be directed to open just one of the valves 74A or 74B at any one time (depending upon the availability of heat from the "free heat" sources) or both valves 74A and 74B at the same time so that both "free heat" sources may contributed to heating together. The controller 58 adjusts the speed of the pump accordingly. There is also a 3-way valve 72 that normally directs fluid to heat exchanger 60 within the tank 112-1. Check valves 73A, 73B, 73C are provided to prevent backflow. When tank temperature is above 185 degrees Fahrenheit controller 58 activates the 3-way valve 72 to alter the flow path so as to route the fluid instead to heat exchanger 71 (outside the tank) until the tank temperature is below 175 degrees Fahrenheit. The heat exchanger 71 than preheats fluid (water or oil) that is to be vaporized by the parabolic dish solar concentrator 80 and fed to the turbine-generator 81 that generates electricity for the grid 83.

The fluid loop 17 of the solar collection unit 18 and HRU 16 is shown (FIG. 1) by way of example as an indirect or closed-loop circulation system where the circulating pump 54 circulates the heat-transfer fluid through the solar collector 56 and HRU 16 in fluid communication with the heat exchanger 60 to indirectly heat the water in the tank 12. However, the solar collection unit 18 may also be a direct or open-loop circulation system in which the pump 54 circulates the potable water from the tank 12 directly through the solar collector 56 and HRU 16 back into the tank 12.

Conversely, while the fluid loop 17 of the heat recovery unit 16 is shown (FIG. 1) by way of example as a indirect or closed-loop circulation system where the pump 54 circulates the fluid medium from the tank 12 through the heat exchanger 26 and back into the tank 12, the fluid loop 17 may instead be an indirect or closed-loop circulation system isolated from the water in the tank 12 in which the pump 54 circulates a heat-transfer fluid through the heat exchanger 26 and through an additional heat exchanger 60 in a heat exchange relationship with the water in tank 12 to indirectly heat the water in the tank.

In addition, the heat exchanger 60 disposed at the tank 12 is shown by way of example only as a flat heat exchanger in tank 12. However, it is contemplated that the heat exchanger 60 may be any device sufficient to place the heat-transfer fluid of the solar collection unit 18 in a heat exchange relationship with the water in the tank 112-1. The tank 112-1 may also be a jacketed tank in which the heat exchanger 60 forms a heat exchange jacket around the outer surface of the tank 112-1.

The solar collector 56 can be any device sufficient to collect heat from solar energy. For example, the solar collector 56 can be a glazed flat-plate collector, an un-glazed flat-plate collector, an evacuated-tube solar collector, a photo-voltaic module, a drain-back system, and any combinations thereof.

The term "glazed flat-plate collectors" used herein refers to collectors having an insulated, weatherproofed box that contains a dark absorber plate under one or more glass or plastic covers. The term "unglazed flat-plate collectors" used herein refers to collectors having a dark absorber plate, made of metal or polymer, without a cover or enclosure. The term "evacuated-tube solar collectors" used herein refers to collectors having parallel rows of transparent glass tubes where each tube contains a glass outer tube and a metal absorber tube attached to a fin. The fin's coating absorbs solar energy but inhibits radiative heat loss. The term "photo-voltaic module" used herein refers to collectors having an array of photovoltaic cells that convert solar energy into electrical potential. The electrical potential can be used to provide current to an electrical heating element, which heats the water in the tank 112-1.

The controller 58 of the solar water heater unit 18 controls the circulating pump 54 to circulate the heat-transfer fluid from the heat exchanger 60 in the tank 112-1 through the solar collector 56 only when heat is available at the solar collector 56. For example, the controller 58 may receive an input 66 indicative of a condition of the solar collector 56. The input 66 may include, but is not limited to, a temperature signal indicative of the temperature of the heat-transfer fluid at the solar collector 56. When the input 66 reaches a predetermined limit indicating that sufficient heat is available from the solar collector 56, the controller 58 activates the circulation pump 54.

The controller 58 is preferably configured to activate the circulating pump 54 to cease circulating the heat-transfer fluid through the solar collector 56 and the heat exchanger 60 when the water within the tank 12 reaches a predetermined temperature. For example, the controller 58 can receive an input from sensor 68 that is indicative of a temperature of the water within the tank 112-1. When the input from the sensor 68 reaches a predetermined limit, the controller 58 deactivates the circulating pump 54. The circulating pump 54 can be an electrically powered pump, powered by a standard 115-volt power source. The pump 54 may also be powered by electricity collected by a photo-voltaic solar collector (not shown).

The controller 58 is described by way of example as operating based on a temperature limit (e.g., input from a sensor 66) and a temperature limit (e.g., input from the sensor 68). However, the controller 58 may also operate as a differential controller in which the controller 58 activates the circulating pump 54 when the inputs from sensors 66, 68 are indicative of a temperature differential of at least a predetermined value. For example, the controller 58 can be configured to activate the circulating pump 54 when the sensed inputs from sensors 66, 68 are indicative of at least approximately 8 degrees Fahrenheit (F.) and can deactivate the pump when the temperature differential is less than approximately 8 degrees Fahrenheit (F.). Similarly, the controller 58 of the heat recovery unit 16 (FIG. 1) may be configured to operate as a differential controller in which the controller 58 only activates the circulating pump 54 when the inputs from sensors 69/68 are indicative of at least a predetermined value. The controller 58 can also operate to deactivate the circulating pump 54 upon the input from sensor 66 exceeds a temperature limit indicative that the solar collector is at a maximum temperature for preventing damage to system components. A relief valve (not shown) is operably coupled to the flow loop 17 for lowering the pressure within the flow loop 17 in the event that the input from the sensor 66 exceeds the temperature limit. In an open configuration of the relief valve, the second heat transferring medium is drained from the flow loop 17 in gas or liquid form to lower the pressure therein.

The controller 58 can be embodied by a variety of control circuitry, such as a programmed controller or dedicated hardware logic (PLD, FPGA, ASIC) and supporting circuitry (e.g., thermistors for temperature sensing or pressure transducers for pressure sensing), one or more relays and supporting circuitry (e.g., thermostats for temperature sensing or pressure controllers for pressure sensing) or other suitable circuitry. In an exemplary embodiment, the controller 58 is realized by a programmed controller adapted for differential temperature control of solar energy systems, such as the Resol module.

When heat is unavailable from either the heat recovery unit 16 or the solar collection unit 18, the system 10 utilizes a conventional heating element 120 to heat the water in the tank 12. Heating element 20 may be an electrically powered element, a gas-burning element, an oil-burning element, and combinations thereof.

The hybrid hot water heat system 110 of the present invention thus combines three heating sources, two of which are available without consuming additional energy. Additionally, the fan control 30 of the hybrid hot water heat system 110 of the present invention selectively activates and deactivates the fan 36 of the vapor compression refrigeration unit 22 to minimize the available heat expelled to the ambient air 38. The fan control 30 also maximizes the amount of heat recovered by the heat recovery unit 16 and minimizes the amount of energy used while protecting the vapor compression refrigeration unit 22 from being damaged.

The bypass system 180 allows a user to divert incoming water from the water source 14 to bypass the pre-heating tank 112-1 to flow directly into the heating tank 112-2. In the illustrated embodiment of FIG. 1, the bypass system 180 includes a first valve 182, a second valve 184, and a third valve 186, each being a two-way valve having an open state and a closed state. When an operator desires the use of the pre-heating tank 112-1, the first and second valves 182, 184 can be moved to the open state while the third valve 186 is moved to the closed state. In this configuration, water from the water source 14 flows through the first valve 182 into the pre-heat tank 112-1 and from the pre-heat tank 112-1 to the heating tank 112-2 through the second valve 184.

Conversely, when an operator desires to bypass pre-heating tank 112-1, the first and second valves 182, 184 can be moved to the closed state while the third valve 186 is moved to the open state. In this configuration, water from the water source 14 flows through the third valve 186 directly into the heating tank 112-2 without passing through pre-heating tank 112-2.

The bypass system 180 is described above by way of example as a manually activated system in which the operator moves the valves 182, 184, 186 between the open and closed states. However, it is contemplated that the valves of bypass system 180 may be automatically controlled between the open and closed states based on the availability of heat from either the heat recovery unit 16 or the solar collection unit 18.

Additionally, the bypass system 180 is described above by way of example with respect to the three separate two-way valves 182, 184, and 186. However, it is contemplated that the bypass system 180 may include any combination of valves sufficient to selectively place the pre-heating tank 112-1 in fluid communication with the water source 14 and the heating tank 112-2. For example, it is contemplated that the bypass system 180 may include one three-way valve that replaces the first and third valves 182, 186.

When the temperature in the pre-heating tank 112-1 reaches 160 degrees Fahrenheit, valves 74A and 74B may remain open as long as there is heat available from them. The controller 58 activates the three-way valve 72 to route the fluid to the heat exchanger 71 instead of the pre-heating tank 112-1 and directs a driver of the pump 82 to pump at a flow rate (perhaps higher than before) since heat exchange will be available to pre-heat the further fluid (water or oil) passing through the heat exchanger 71, provided the sensor 85 by the parabolic dish solar concentrator (collector) 80 senses a temperature above 220 degrees Fahrenheit. Such activation is carried out by issuing appropriate command signals to drivers for those valves.

When the sensor 85 by the parabolic dish solar concentrator (collector) 80 senses a temperature above 220 degrees Fahrenheit even though the demand for heated potable water at the pre-heating tank 112-1 has not yet been satisfied, the controller 58, which received the sensed temperature measurement, sends command signals to the pump 82 to pump the further fluid to the parabolic dish solar collector 80 (perhaps at a lower flow rate than would be the case if the demand were satisfied) to vaporize the fluid such as to produce steam where the fluid is water. The vaporized fluid is fed to a turbine generator 81 to turn the turbine blades to produce electricity, which is transmitted to the power grid 83 via electrical connections. Note that the heating of the potable water in the pre-heating tank 112-1 is essentially independent of what transpires at the parabolic dish solar collector 80, which is why the parabolic dish solar collector should be vaporizing the fluid if conditions are suited to do so. That process just becomes more efficient after the demand for heating of the potable water is satisfied, because the fluid becomes pre-heated by heat exchange at heat exchanger 71 before the fluid reaches the parabolic dish solar collector 80.

The flow rate set for the pump 82 should be varied by the controller 58 in dependence upon the sensed temperature of the further fluid downstream of the further heat exchanger 71. For instance, if the further fluid is not being pre-heated at the further heat exchanger 71 (perhaps because the demand for heating potable water at the tank 112-1 is not satisfied), then the temperature of the further fluid will be lower than would otherwise be the case prior to reaching where sensor 85 detects the temperature imparted by the parabolic dish solar concentrator (collector) 80 that concentrates solar radiation. As a result, the temperature differential between the further fluid temperature and the boiling point of the further fluid is greater than would be the case if pre-heating were available and thus the vaporization rate will be slower (i.e., as to the vaporization capacity or the amount of the further fluid that can be vaporized over time). On the other hand, if the further fluid is pre-heated by the further heat exchanger 71 (as would be the case where the at least one free energy source is generating heat and the demand for heating the potable water in the tank 112-1 is satisfied), the temperature differential required to be met to effect the vaporization will be smaller so that the vaporization rate will be faster for the same flow rate than when there is no pre-heating of the further fluid at the further heat exchanger. Even so, thanks to the heat exchange at the heat exchanger 105, there should be some realization of elevation in the temperature of the condensate at all times that electricity is being generated and thereby the further fluid entering the further heat exchanger 71 will be at that higher temperature. Thus, there will be a smaller temperature differential that needs to be met to effect vaporization of the further fluid. However, the pre-heating of the further fluid at the further heat exchanger, when available, should lessen the temperature differential still further (if the flow rate stays the same). As a result, the controller 58 may change the flow rate of the further fluid accordingly to match the capacity for vaporizing the further fluid by the parabolic dish solar concentrator (collector) 80 (i.e., to handle a greater flow rate of the further fluid).

The controller 58 may take into account measurements of at least one parameter by sensors suitably arranged to take such measurements. For instance, the measurements may be that of fluid temperature, infrared radiation wavelength emanating from the fluid, and/or fluid pressure.

In one aspect, the invention resides in a dual hybrid fluid heating apparatus (method of assembly and method of operation); comprising: equipment that includes a pump, a tank, at least one free heat energy source, a parabolic dish solar concentrator and a turbine generator, the at least one free heat energy source being selected from the group consisting of at least one waste heat recovery unit and at least one solar collector unit; drivers of the equipment and associated valves that affect flow through piping; and at least one controller 58 with logic that makes determinations based on sensor readings to issue appropriate command signals to the drivers, the sensor readings being selected from a group consisting of an extent of heat exchange by a tank heat exchanger within the tank, an extent of heat exchange by a further heat exchanger, an extent of fluid vaporization, the drivers being responsive to receipt of the appropriate command signals to:

(a) circulate fluid between the at least one free energy source and the tank heat exchanger provided the extent of heat exchange by the tank heat exchanger signifies that a demand for heating potable water within the tank is unsatisfied according to the determinations;

(b) circulate the fluid between the at least one free energy source and a further heat exchanger so as to bypass the tank heat exchanger and heat a further fluid by heat exchange with the circulating fluid provided the extent of heat exchange by the tank heat exchanger signifies that the demand is satisfied according to the determinations;

(c) divert the fluid to a heat dump provided the extent of heat exchange by the further heat exchanger signifies that temperature downstream of the further heat exchanger attained a threshold level according to the determinations; and (d) circulate the further fluid at a flow rate set by the controller to pass through the further heat exchanger and then to a location where heat imparted from concentrated solar radiation reflecting off a parabolic dish solar concentrator vaporizes the further fluid into a vapor that enters a turbine generator to turn a blade causing the turbine generator to generator electricity to a power grid and after which leave the turbine generator to condense into a liquid from heat extraction, the controller setting the flow rate based on a determination that takes into account a sensed parameter of the further fluid downstream of the further heat exchanger and on a sensed extent of vaporization of the further fluid from the solar radiation reflecting off the parabolic dish solar concentrator; and (e) circulate an additional fluid at a further flow rate between a cooling tower and an additional heat exchanger that effects the heat extraction of the vapor and blowing air into the cooling tower with the cooling tower fan to cool the additional fluid heated by the heat extraction, the controller setting the further flow rate based on making a determination that takes into account an extent of the heat extraction and setting a speed of a cooling tower fan that blows air into the cooling tower to cool the additional fluid based on the determination that takes into account the extent of the heat extraction.

Preferably, an appliance is selected from the group consisting of a refrigerator, a freezer, a refrigerator-freezer, a walk-in refrigerator and a walk-in freezer. The at least one waste heat recovery unit recovers waste heat from the appliance.

Electrical connections are arranged to enable the transfer of the electricity to the power grid. The making of the determinations by the controller on varying the rate of flow of the further fluid is also based on detection of whether the electrical connections are suited to transfer the electricity to the power grid. For instance, if the power grid is down (black-out) or the electrical connections are undergoing maintenance, then signals would be sent to the controller signifying that the transfer of electricity generation is not feasible. The electrical connections may include a disconnect switch that would be thrown to disconnect from the power grid during maintenance periods.

Sensors are arranged to measure at least one parameter—i.e., selected from the group consisting of temperature, pressure and infrared radiation wavelength. The controller is arranged to receive the at least one measured parameter from the sensors and issues the command signals based in part on the at least one measured parameter.

Once the vapor finishes turning a blade of the turbine 81A of the turbine-generator 81, the vapor, now at a lower pressure, is routed to a heat exchanger 105 within a pre-heater tank 87 where the fluid in the pre-heater tank 87 is heated through the extraction of heat form the low pressure vapor. The low pressure vapor may partially transform into a low pressure vapor/liquid mix after emerging from the heat exchanger 105, but flows by gravity down to heat exchanger 103, which it is transformed into condensate due to heat exchange by the heat exchanger 103.

To help ensure that the low pressure vapor/liquid mix is transformed into condensate, a cooling tower 97 is employed to cool fluid that is pumped by pump 101 to circulate through the heat exchanger 103 to extract heat from the low pressure vapor/liquid, thereby transforming the mix into condensate. A fan is driven by a motor driver 95 to blow air through the cooling tower to cool the heated fluid leaving the heat exchanger 103 that is pumped by the pump 101. Sensors 93 and 99 measure the temperature (or pressure) in the cooling tower 97 and the fluid being pumped, respectively, to transmits the measurements to the controller 58. The controller 58 then directs the motor driver 95 of the cooling tower fan and the motor driver of the circulating pump 101 to set their speeds.

For example, if the demand to heat potable water in the tank 112-1 has not been satisfied, then there may be less pre-heating available at heat exchanger 71 than would be the case if the demand was satisfied. As a consequence, there is less pre-heated fluid reaching the parabolic dish solar collector 80 for vaporization and thus potentially less available vapor produced over time to turn the turbine blades of the turbine 81A than would otherwise be the case if the demand was satisfied. As a consequence, the amount of vapor requiring cooling over time is less at the time it reaches the heat exchanger 103 and thus less heat needs to be extracted over time to be cooled by the cooling tower 97 than if the demand were satisfied. With less cooling needs, the cooling tower fan and the pump 103 may run at a slower speed in comparison to when the vapor is produced at maximum capacity (such as when the demand for heating potable water is satisfied, the waste recover unit 16 is extracting waste heat and the solar collection unit 56 and the parabolic dish solar concentrator are receiving insolation).

The condensate is then circulated by pump 82 back to the heat exchanger 75 to be heated, but only after the condensate is preheated by heat exchange at heat exchanger 105. Should there be any build-up of vapor in the tank 87, a pressure relief valve is provided at the top of tank 87 to provide the pressure relief. This is done before the vapor is directed to the heat exchanger 103, where the cooling fan 97 cools the vapor back into condensate.

While the present disclosure has been described with reference to one or more exemplary embodiments, it is not intended that the invention be limited thereto, and it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments.

In another aspect, the invention resides in a dual hybrid fluid heating apparatus, a method of assembling the dual hybrid fluid heating apparatus and a process of operating the dual hybrid fluid apparatus. The dual hybrid fluid heating apparatus may have at least one controller 58 equipped with
- (a) heat availability logic that determines whether heat from at least one free energy source is or is not available for heat exchange and, if so, issues appropriate commands to effect the heat exchange; and
- (b) vaporization viability logic that determines whether vaporization of vaporizable fluid is viable with concentrated solar ration from at least one parabolic dish solar concentrator and, if so, issues appropriate command signals to heat the vaporizable fluid with heat from the heat exchange to pre-heat the vaporizable fluid and to thereafter vaporize the pre-heated vaporizable fluid into a vapor by concentrated solar radiation from the at least one parabolic dish solar concentrator up to an extent of viability.

Preferably, the at least one controller 58 is equipped also with heat extraction logic that determines whether heat extraction from the vapor is viable and, if so, to issue appropriate command signals to extract the heat from the vapor to transform the vapor into a condensate and to thereafter heat the condensate with the extracted heat. The at least one controller 58 may have additional logic that issues additional appropriate command signals that cause an additional fluid to circulate at a flow rate between a cooling tower and an associated heat exchanger and to cool the additional fluid within the cooling tower by forced air blown from a cooling tower fan into the cooling tower. The at least one controller 58 sets the flow rate and sets a speed of the cooling tower fan.

What is claimed is:

1. A dual hybrid fluid heating apparatus; comprising:
   at least one controller having control circuitry and equipped with
   heat availability logic responsive to receipt of appropriate sensor input to make a determination as to whether heat from at least one free energy source is or is not available for heat exchange and, if so, to issue appropriate commands accordingly; and
   vaporization viability logic responsive to receipt of further sensor input for making a determination as to whether vaporization of the vaporizable fluid is viable with concentrated solar radiation from at least one parabolic dish solar concentrator and, if so, to issue further commands accordingly; and
   means responsive to receipt of the appropriate commands for heating the vaporizable fluid accordingly with heat from the heat exchange to thereby pre-heat the vaporizable fluid; and
   means responsive to receipt of the further commands for thereafter vaporizing the pre-heated vaporizable fluid into a vapor by with concentrated solar radiation from the at least one parabolic dish solar concentrator.

2. The dual hybrid fluid heating apparatus of claim 1, further comprising
   means for extracting the heat from the vapor to transform the vapor into a condensate and for thereafter heating the condensate with the extracted heat.

3. The dual hybrid fluid heating apparatus of claim 1, further comprising
   means for extracting the heat from the vapor to transform the vapor into a condensate;
   additional logic responsive to additional sensor input for issuing additional commands accordingly;
   means responsive to receipt of the additional commands for causing an additional fluid to circulate at a flow rate between a cooling tower and an associated heat exchanger; and
   means for cooling the additional fluid, said means for cooling including a cooling tower fan that blows forced air from the cooling tower in a manner that cools the additional fluid, the at least one controller setting the flow rate and setting a speed of the cooling tower fan.

4. The dual hybrid fluid heating apparatus of claim 1, further comprising means for pre-heating the vaporizable fluid via the heat exchange; and means for vaporizing the pre-heated vaporizable fluid by the concentrated solar radiation from the at least one parabolic dish solar concentrator in response to receipt of the appropriate command signals.

5. The dual hybrid heating apparatus of claim 4, further comprising the at least one free energy source, the at least one free heat energy source being selected from the group consisting of at least one waste heat recovery unit and at least one solar collector unit, the at least one free energy source being configured and arranged to provide the heat for the heat exchange.

6. The dual hybrid fluid heating apparatus of claim 5, wherein the at least one free energy source is at least one heat recovery unit of an appliance selected from the group consisting of an air conditioner, a heat pump, a refrigerator, a freezer, a refrigerator-freezer, a walk-in refrigerator and a walk-in freezer, the at least one waste heat recovery unit recovering waste heat from the appliance.

7. The dual hybrid heating apparatus of claim 5, further comprising
   a turbine generator having a blade;
   a parabolic dish solar concentrator arranged to concentrate the solar radiation at a location to form the vapor from the vaporizable fluid;
   means for feeding the vapor to turn the blade of the turbine generator to effect electricity generation;
   means for condensing the vapor from the turbine generator into the condensate by the heat extraction in an associated heat exchanger; and
   another heat exchanger arranged upstream and at a higher elevation than the associated heat exchanger so that the vapor from the turbine generator heat exchanges with the condensate within the another heat exchanger before the vapor enters the associated heat exchanger.

8. A method of assembling a dual hybrid fluid heating apparatus, comprising:
   equipping at least one controller with control circuitry to
   (a) make a determination with heat availability logic in response to receipt of appropriate sensor input as to whether heat from at least one free energy source is or is not available for heat exchange and, if so, to issue appropriate commands accordingly to effect the heat exchange; and (b) to make a determination with vaporization viability logic in response to receipt of a further sensor input as to whether vaporization of vaporizable fluid is viable with concentrated solar ration from at least one parabolic dish solar concentrator and, if so, to issue further commands accordingly;

configuring a means for heating the vaporizable fluid to respond to receipt of the appropriate commands to pre-heat the vaporizable fluid with heat from the heat exchange; and configuring a means for vaporizing the pre-heated vaporizable fluid into a vapor to respond to receipt of the further commands to vaporize the pre-heated vaporizable fluid into the vapor with concentrated solar radiation from the at least one parabolic dish solar concentrator.

9. The method of claim 8, further comprising arranging a means for extracting heat from the vapor to heat condensate with the extracted heat, the vapor transforming into the condensate as the means for extracting the heat from the vapor extracts the heat from the vapor.

10. The method of claim 9, further comprising arranging a means responsive to receipt of additional commands for circulating an additional fluid between a cooling tower and an associated heat exchanger; and arranging a cooling tower fan to blow forced air from the cooling tower in a manner that cools the additional fluid tower fan;

configuring the at least one controller to set a flow rate of the circulating additional fluid and to set a speed of the cooling tower fan.

11. The method of claim 8, further comprising selecting the at least one free heat energy source from the group consisting of at least one waste heat recovery unit and at least one solar collector unit.

12. The method of claim 11, further comprising arranging a parabolic dish solar concentrator to concentrate the solar radiation at a location to form the vapor from the vaporizable fluid;

arranging a turbine generator equipped with a blade so that feeding the vapor to the turbine generator turns the blade of the turbine generator, which effects electricity generation;

arranging an associated heat exchanger to extract heat from the vapor and thereby condense the vapor into condensate; and arranging another heat exchanger upstream and at a higher elevation than the additional heat exchanger so that the vapor from the turbine generator heat exchanges with the condensate within the another heat exchanger before the vapor enters the associated heat exchanger.

13. The method of claim 12, further comprising selecting, as the at least one free energy source, at least one heat recovery unit of an appliance from the group consisting of an air conditioner, a heat pump, a refrigerator, a freezer, a refrigerator-freezer, a walk-in refrigerator and a walk-in freezer, the at least one waste heat recovery unit recovering waste heat from the appliance.

14. A process of operating a dual hybrid heating apparatus, comprising operating at least one controller having control circuitry and equipped with (a) heat availability logic that makes a determination as to whether heat from at least one free energy source is or is not available for heat exchange in response to receipt of a sensor input and, if so, issues appropriate commands to effect the heat exchange; and (b) vaporization viability logic that makes a determination as to whether vaporization of vaporizable fluid is viable with concentrated solar radiation from at least one parabolic dish solar concentrator in response to receipt of a further sensor input and, if so, issues further commands accordingly; and in response to receipt of the appropriate commands and the further commands, heating the vaporizable fluid with heat from the heat exchange to pre-heat the vaporizable fluid and to thereafter vaporize the pre-heated vaporizable fluid into a vapor by concentrated solar radiation from the at least one parabolic dish solar concentrator.

15. The process of claim 14, further comprising pre-heating the vaporizable fluid via the heat exchange in response to receipt of the appropriate commands; and vaporizing the pre-heated vaporizable fluid by the concentrated solar radiation from the at least one parabolic dish solar concentrator in response to receipt of the further commands.

16. The process of claim 15, further comprising:

selecting the at least one free heat energy source from the group consisting of at least one waste heat recovery unit and at least one solar collector unit, the at least one free energy source providing the heat for the heat exchange for effecting the pre-heating of the vaporizable fluid.

17. The process of claim 16, further comprising:

concentrating solar radiation from a parabolic dish solar concentrator at the location to form the vapor from the vaporizable fluid;

feeding the vapor to turn a blade of a turbine generator to effect electricity generation;

discharging the vapor from the turbine generator to condense the vapor into the condensate by the heat extraction in an associated heat exchanger; and before the discharged vapor enters the associated heat exchanger, heat exchanging the discharged vapor with the condensate within another heat exchanger that is upstream and at a higher elevation than the associated heat exchanger.

18. The process of claim 16, further comprising selecting, as the at least one free energy source, at least one heat recovery unit of an appliance from the group consisting of an air conditioner, a heat pump, a refrigerator, a freezer, a refrigerator-freezer, a walk-in refrigerator and a walk-in freezer.

19. The process of claim 14, further comprising:

equipping the at least one controller also with heat extraction logic;

making a determination with the heat extraction logic as to whether heat extraction from the vapor is viable in response to an additional sensor input and, if so, issuing additional commands accordingly;

in response to receipt of the additional commands, extracting the heat from the vapor to transform the vapor into a condensate;

equipping the at least one controller with further more logic; issuing more commands with the more logic;

in response to receipt of the more commands, circulating an additional fluid between a cooling tower and an associated heat exchanger to cool the additional fluid within the cooling tower by forced air blown from a cooling tower fan into the cooling tower, the at least one controller setting a flow rate of the circulating additional fluid and setting a speed of the cooling tower fan.

* * * * *